United States Patent [19]
Dunford

[11] Patent Number: 4,872,690
[45] Date of Patent: Oct. 10, 1989

[54] SEAL CAVITY PROTECTOR

[75] Inventor: Joseph R. Dunford, Waverley, Canada

[73] Assignee: Enviroseal Engineering Products Ltd., Waverly, Canada

[21] Appl. No.: 242,174

[22] Filed: Sep. 9, 1988

[51] Int. Cl.$^4$ .............................................. F16J 15/00
[52] U.S. Cl. ........................................ 277/24; 277/25; 277/68
[58] Field of Search ...................... 277/24, 205, 206 R, 277/206 A, 80, 133, 57, 58, 14 R, 14 V, 23, 25, 3, 67, 68, 69, 70, 71; 415/110, 111, 112, 115

[56] References Cited

U.S. PATENT DOCUMENTS

| | | |
|---|---|---|
| 2,834,618 | 5/1958 | Wiltse . |
| 2,874,982 | 2/1959 | Winther . |
| 2,919,148 | 12/1959 | Smith . |
| 3,070,028 | 12/1962 | Loy et al. .......................... 277/133 |
| 3,447,847 | 6/1969 | Stansell et al. ...................... 277/67 |
| 3,853,327 | 12/1974 | Nellis .................................. 277/67 |
| 3,881,840 | 5/1975 | Bunjes . |
| 4,386,780 | 7/1983 | Dernedde . |
| 4,402,515 | 9/1983 | Malott ................................ 277/24 |
| 4,482,160 | 11/1984 | Yamagi et al. ...................... 277/24 |
| 4,502,695 | 3/1985 | Choi .................................. 277/67 |
| 4,685,685 | 8/1987 | Iverson .............................. 277/205 |

FOREIGN PATENT DOCUMENTS 0026823 8/1980 European Pat. Off. .
212879 1/1924 United Kingdom .

Primary Examiner—William A. Cuchlinski, Jr.
Assistant Examiner—Petar Arsenovic
Attorney, Agent, or Firm—Jones, Tullar & Cooper

[57] ABSTRACT

A seal cavity protector for use with rotary fluid equipment having a seal cavity, defined by a shaft, a shaft housing and a seal engaging the shaft, includes an annular cup-shaped element for securement to the housing at the entrance thereto. The shaft can pass through the element. A plurality of circumferentially spaced apart vent passages extend through the wall of the element. As the equipment rotates fluid passing by the vent passages creates a low pressure area outside the seal cavity whereby fluid contained within, or flowing into, the cavity is drawn out through the vent passages. Any contaminants contained in the cavity or entering with the fluid are removed from the cavity with the exiting fluid. This reduces pressure within the cavity and reduces greatly the chance of damage to the shaft and/or seal by the contaminants.

21 Claims, 4 Drawing Sheets

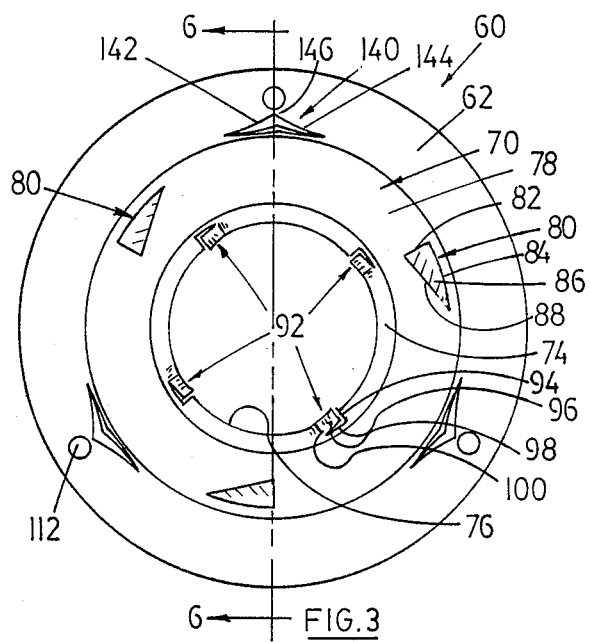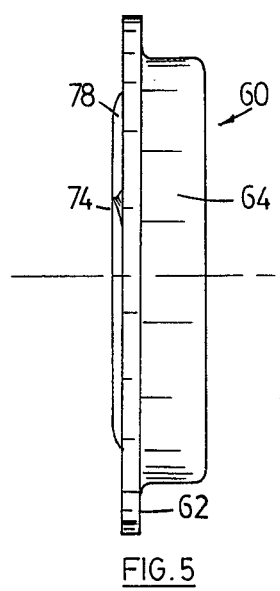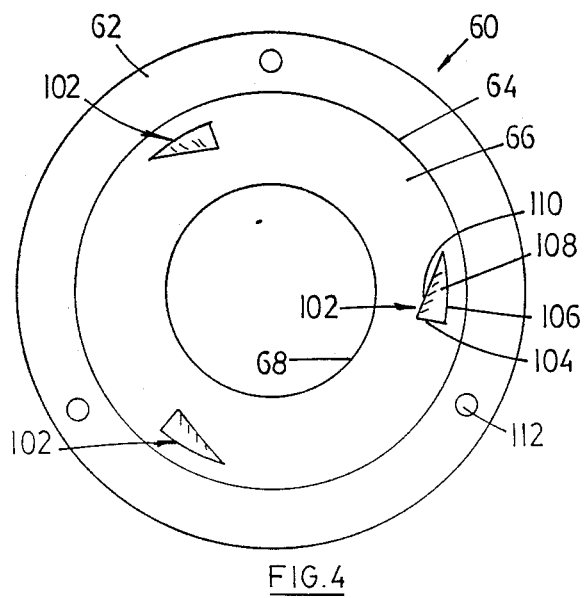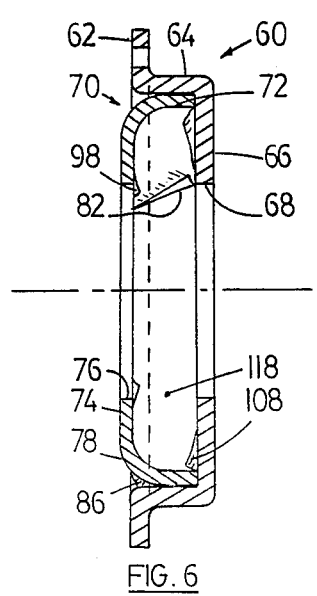

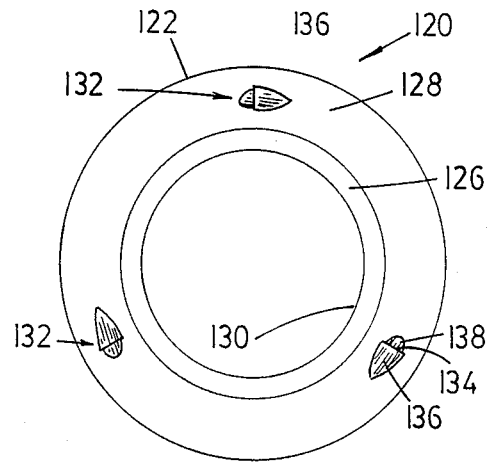
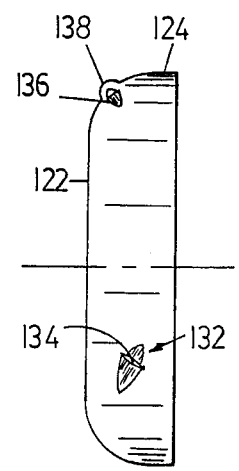
FIG.10  FIG.11
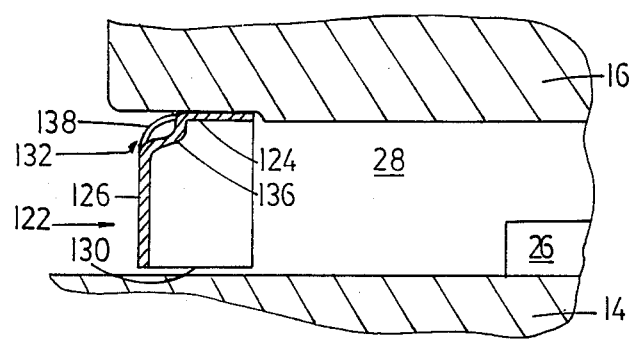
FIG.12
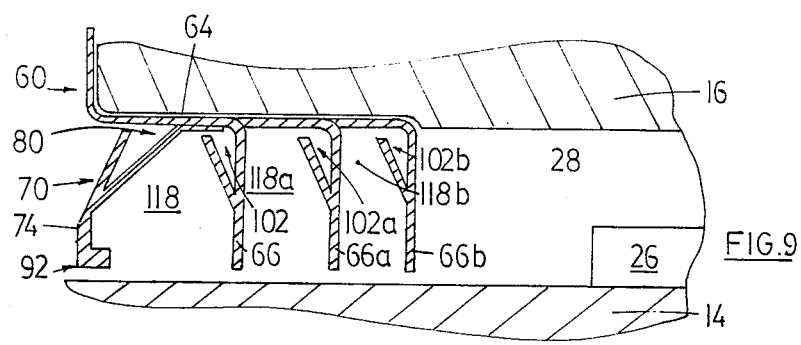
FIG.9

SEAL CAVITY PROTECTOR

This invention relates to a device which can be positioned at the entrance to a seal cavity in rotary fluid equipment to protect the cavity from particulate contaminant material and/or to reduce the fluid pressure within the cavity.

BACKGROUND OF THE INVENTION

Rotary fluid equipment, such as centrifugal pumps, usually includes a rotary operative member such as an impeller which is driven by a prime mover such as an electrical motor. A rotary shaft connects the prime mover to the operative member. Typically the operative member is contained within its own housing, having an inlet and an outlet for the fluid being moved, and the shaft is also contained within a shaft housing. The shaft may be supported by bearings and usually there will be seals engaging the shaft to prevent fluid which enters the shaft housing from reaching the prime mover. The seals, shaft and shaft housing define a seal cavity which opens towards the housing containing the operative member.

During operation of the rotary fluid equipment particulate contaminant material carried into the equipment by the moving fluid, or eroded from the adjacent surfaces with the housing, can enter the seal cavity and damage the shaft and/or the seals unless some type of protector is arranged at the entrance to the seal cavity.

There have of course been attempts in the past to protect the seal cavity. Most such attempts have involved the attachment of a plate or other member to the rotor at the entrance to the seal cavity to aid in eliminating air (U.S. Pat. No. 3,070,028) or to prevent fluid from entering the seal cavity when the equipment comes to a halt (U.K. Pat. No. 212,879). Other attempts involve labyrinth type seals which involved elements on the shaft and the shaft housing which are interdigitated to increase the difficulty for contaminants to enter the seal cavity (U.S. Pat. Nos. 2,834,618; 2,874,982; 4,185,838 and 4,335,886). None of these prior art arrangements have simply or inexpensively been an appropriate solution to the problem.

SUMMARY OF THE INVENTION

The present invention on the other hand provides a simple seal cavity protector which is affixed to the shaft housing rather than the shaft and which does not contact the shaft, allowing the shaft to pass therethrough. By utilizing an arrangement of vent passages therethrough the protector of the present invention causes pressure differentials thereacross, resulting from the rotational fluid flow past the vent passages at the entrance to the seal cavity. Fluid, possibly carrying contaminants, is allowed to enter the seal cavity either through the protector itself or between the protector and the shaft, but due to the currents resulting from the pressure differentials the fluid quickly circulates from the seal cavity through the vent passages, carrying contaminants with it. By using the protector of the present invention there will be no accumulation of contaminants within the seal cavity. Furthermore, there will also be a reduction of the fluid pressure in the seal cavity in comparison to the fluid pressure therein absent the seal cavity protector of this invention.

Broadly speaking therefore the invention may be considered as providing a seal cavity protector for use with rotary fluid equipment a seal cavity of which is defined by a rotary shaft, a shaft housing and seal means engaging the shaft, the protector comprising an annular generally cup-shaped element adapted to pass the shaft therethrough and to be secured to the housing at the entrance to the seal cavity, the element including a plurality of circumferentially spaced apart, generally tangentially directed, first vent passages extending through the wall thereof whereby, with the protector in place and as the equipment rotates, a low pressure area is created adjacent the element outside the seal cavity and fluid within the seal cavity is drawn therefrom through the vent passages.

BRIEF DESCRIPTION OF THE DRAWINGS

FIGS. 3, 4 and 5 are front, rear and side views respectively of the preferred form of the protector of this invention.

FIG. 6 is a cross-section taken on the line 6—6 of FIG. 3.

FIG. 9 is a view similar to FIG. 8 showing a multi-zone protector in accordance with the present invention.

FIGS. 10 and 11 show front and side views respectively of a basic form of the present invention.

FIG. 12 is a view similar to FIG. 8 showing the embodiment of FIGS. 10 and 11 in place.

DESCRIPTION OF THE PREFERRED EMBODIMENT

Figure 1:
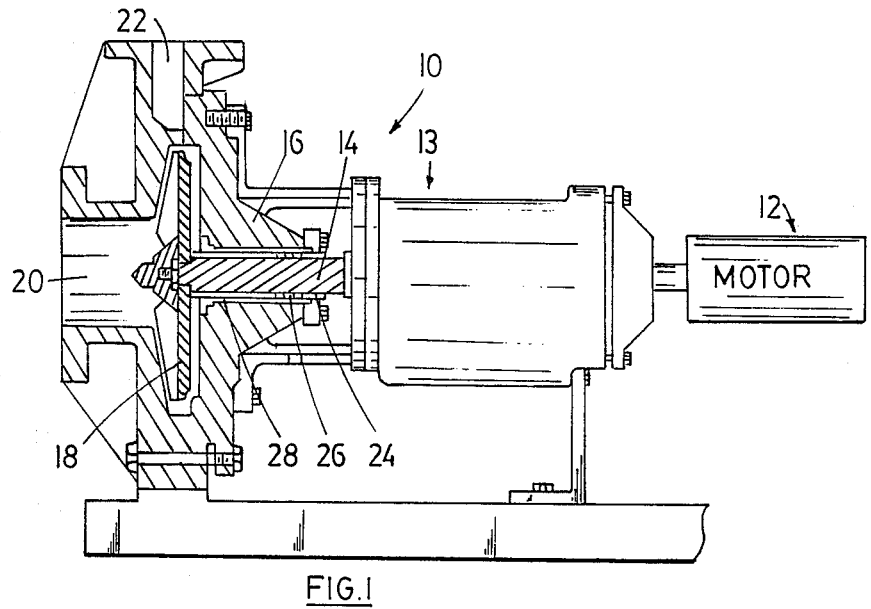
FIG. 1 shows, in partial cross section, an elevational view of typical fluid equipment utilizing the seal cavity protector of this invention.

FIG. 1 illustrates a typical environment for the device of the present invention. In this case the rotary fluid equipment comprises a centrifugal pump 10 which is operated by an electric motor 12. The motor drives a rotary shaft 14 contained within a shaft housing 16 of the bearing housing 13. The shaft is connected to a centrifugal impeller 18 which, as it rotates, draws fluid in through inlet 20 and pumps the fluid out through radial outlet 22. The shaft 14 is typically supported by bearings 24 and seals 26 are provided to protect the bearings from contaminants within the fluid which enter the seal cavity 28. As seen in FIG. 1 the seal cavity 28 is defined in general by the shaft 14, the shaft housing 16 and the seals 26.

Figure 2:
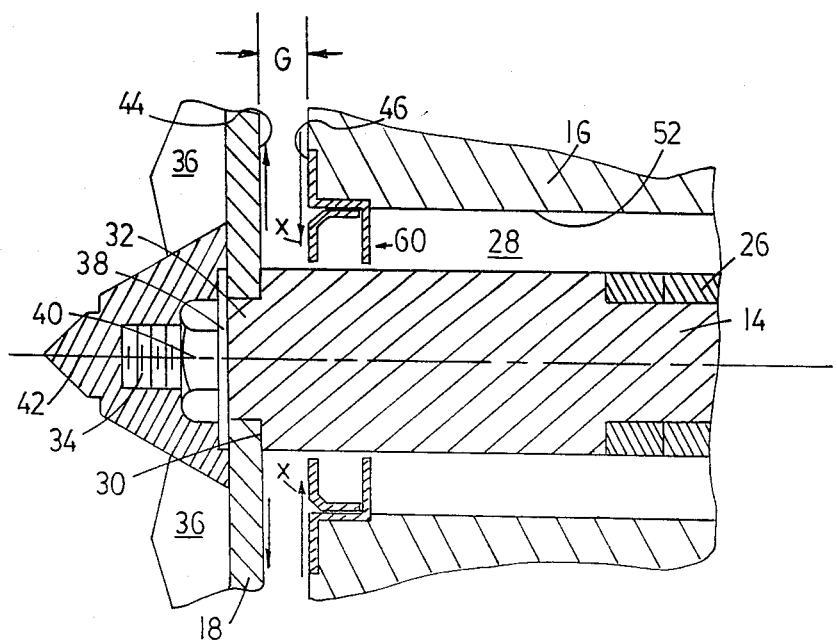
FIG. 2 is an enlarged cross-sectional view at the entrance to the seal cavity, showing the present invention schematically.

FIG. 2 illustrates a somewhat enlarged view of the area where the shaft 14 connects to the impeller 18. It is seen therein that the shaft 14 has a shoulder 30 with a smaller diameter portion 32 extending therefrom. A threaded portion 34 projects from the portion 32. The impeller 18, with vanes 36, fits over the portion 32 and abuts the shoulder 30. A washer 38 and nut 40 are drawn tight against the impeller 18 to clamp it to the shaft 14 and a nose piece 42 fits over the nut, washer and exposed end of the threaded portion 34. With the impeller in place there is a thin gap G between the inner face 44 of the impeller 18 and the outer face 46 of the shaft housing 16.

Seal members 26 are typically held in position on the shaft by a gland or by set screws (not shown).

As discussed earlier, the flow pattern of the fluid in a typical centrifugal pump sets up countercurrents which flow spirally inwardly within the gap G, as shown generally by the arrows A. Such countercurrents create high pressure areas at the entrance to the seal cavity 28 and they also carry contaminant material which, if it enters the seal cavity, can damage the seals 26 and the rotary shaft 14.

It should perhaps be pointed out that the spirally inward countercurrent flow (arrows X) will generally be adjacent the surface 46. Since there are dynamic forces at work there will, of course, be a spirally outward flow as well, such as along surface 44, taking fluid away from the shaft area. However, since the contaminant material carried by the fluid usually has a greater density than the fluid itself there can be an accumulation of contaminant material in the area of the shaft within the gap G, and possibly within the seal cavity 28.

The present invention is intended to overcome the problems indicated above, the present invention taking the form of a seal cavity protector as shown schematically by reference number 60 in FIG. 2. As seen in FIG. 2 the seal cavity protector is positioned at the entrance to the seal cavity 28. It should be noted that all features of the protector 60 are not shown in FIG. 2. Reference should be made to FIGS. 3 to 7 to be discussed hereinbelow.

The seal cavity protector can take one of several configurations depending on whether its prime function is to reduce the contaminant level in the seal cavity and surrounding areas or to reduce fluid pressures in the seal cavity. The preferred embodiment will perform both functions and it is that embodiment which is shown in FIGS. 3 to 7. Other embodiments, both simpler and more sophisticated will be illustrated later.

FIGS. 3 to 5 show front, rear and side views of the seal cavity protector 60 from which it will be seen that it includes a first annular flange 62 extending outwardly from one end of a cylindrical axially extending sleeve member 64. A second annular flange 66 extends inwardly from the other end of the sleeve member 62 and defines a circular opening 68 through which a shaft 14 can pass with a small clearance.

A cup-shaped annular element 70 has a first generally cylindrical, axially extending wall portion 70 which, as seen in FIG. 6 fits within the sleeve member 64. The wall portion 72 should be secured to the sleeve member as by welding to achieve a leak-proof seal therebetween. The element 70 also includes an annular, generally radially extending, second wall portion 74 which defines a circular opening 76 of essentially the same diameter as opening 68 in flange 66 so that the shaft 16 can pass completely through the protector 60. An annular transition wall portion 78 connects the wall portions 72, 74 together and in the drawings the wall portion 78 is shown as being arcuate although it could just as easily be straight or have any other degree of curvature than what is shown.

The element 70 is provided with a plurality of first vent passages 80 circumferentially spaced apart around the element and positioned essentially in the transition wall portion 78. Each first vent passage is defined by a first slit 82 extending through the transition wall portion 78, the first slit being oriented generally radially, and by a second slit 84 which is oriented generally circumferentially adjacent the first wall portion 72. The slits together define a first flap section 86 which is bent outwardly along a fold line 88 to provide a passage from the interior zone 90 of the protector to the exterior.

The element 70 is also provided with a plurality of circumferentially spaced apart second vent passages 92 which are positioned in the second wall portion 74. Each vent passage 92 includes a third slit 94 extending radially outwardly from the opening 76 and a fourth slit 96 which extends circumferentially from the outer end of the third slit 94. These slits define a second flap section 98 which is bent inwardly along a fold line 100 to provide a passage from the exterior to the inner zone 90 within the gap G. The vent passages 92 are oriented along tangents to the circular opening 76.

The second flange 66 at the "rear" of the protector is provided with a plurality of circumferentially spaced apart third vent passages 102. Each vent passage 102 includes a fifth slit 104 extending generally radially from adjacent the sleeve member 64 and a sixth slit 106 extending generally circumferentially adjacent the sleeve member. These slits define a third flap section 108 which is bent inwardly along a fold line 110 to provide a passage from the seal cavity 28 to the interior zone 118 of the protector 60.

The first flange 62 is provided with means, such as circumferentially spaced apart apertures 112, for securing the protector 60 to the shaft housing 16. Machine screws 114 could pass through the apertures 112 for reception in threaded holes (not shown) in the housing. Preferably, the housing will be recessed as shown in FIG. 2 so that the front surface of flange 62 will be generally flush with the housing surface 46.

The first flange 62 is also provided with a plurality of generally triangular raised flow deflectors 140 which have angled, sloping walls 142, 144, which in turn are inclined downwardly and away from a radially outermost apex 146. Depending on the rotation of the shaft 14 either the walls 142 or 144 will increase the circumferential flow component of the fluid spiralling inwardly adjacent the protector so as to improve the capture of such fluid by the vent passages 92 and to improve the flow past the outlets of the vent passages 80.

Figure 7:
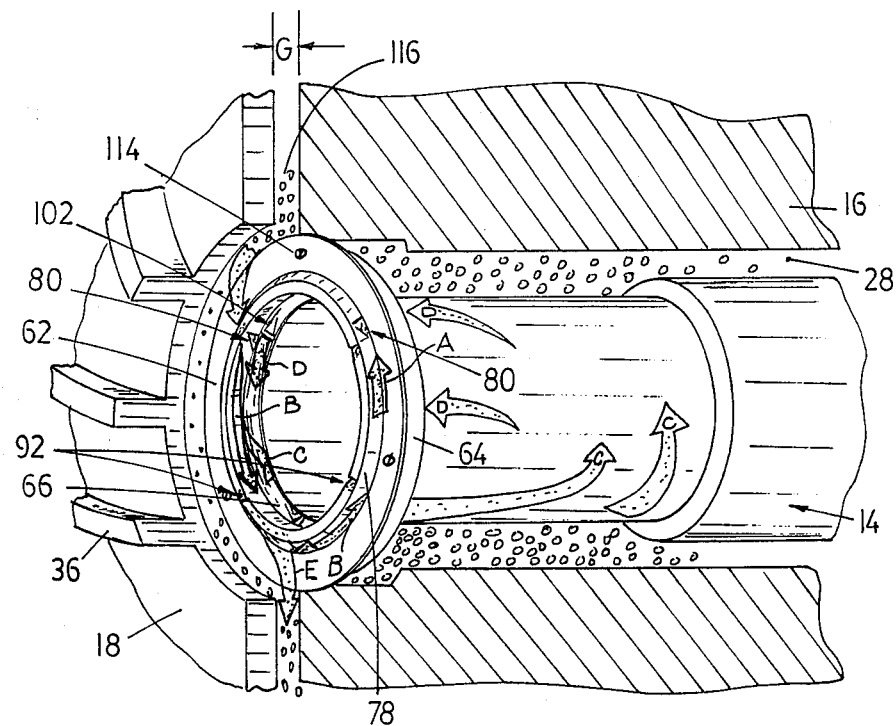
FIG. 7 is a partial perspective view showing the fluid flows associated with the present invention.
Figure 8:
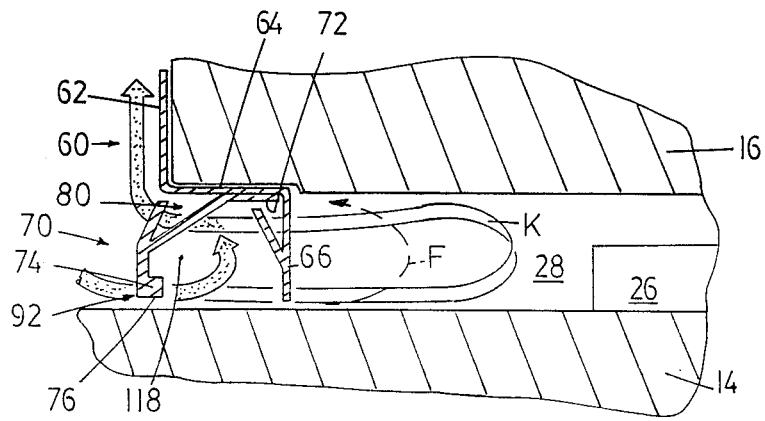
FIG. 8 is an enlarged cross-sectional view at the entrance to the seal cavity.

Reference may now be made to FIGS. 7 and 8 for an explanation of the operation of the seal cavity protector of this invention.

FIG. 7 shows a seal cavity protector 60 mounted to a shaft housing 16, at the entrance to seal cavity 28, by way of machine screws 114. A centrifugal impeller 18 is partially illustrated, attached in a conventional manner to the shaft 14, which shaft passes through the protector 60 from the seal cavity 28.

FIG. 7 also illustrates particulate contaminant material 116 which moves spirally inwardly within the gap G to the vicinity of the shaft 16. Some of the particulate material will pass into the seal cavity by way of the clearance gap between the shaft 14 and the edge of the openings 68 and 76. Additional particulate material will be forced to enter the annular zone 118 within the protector by way of the second vent passages 92. Such vent passages are oriented in the direction of shaft rotation such that fluid and contaminants rotating with the shaft 14 and impeller 18 will be forced to pass through the vent passages 92. Furthermore, the vent passages 92 are oriented tangentially so as to direct fluids and contaminants passing therethrough towards the outer reaches of the zone 118 wherein reside the first vent passages 80. Such flow, through the second vent passages 92, is shown by the arrows B in FIG. 7. The rotating flow within the gap G, caused by the shaft 14, is shown by the arrows A.

As fluid rotates within the protector's annular zone 118 a portion of the contaminant material contained therein will accumulate towards the circumferentially outer portion of the zone due to centrifugal force, and another relatively clean portion of the contaminant flow will enter the seal cavity between the shaft 14 and the edge of the second flange opening 68. As the shaft 14 rotates such material will flow within the cavity 28 along lines shown by the arrows C, D (FIG. 7) to exit the cavity via the third vent passages 102, re-entering the zone 118. Once a steady state has been reached, shortly after shaft start-up, there will be continuous flow along the shaft surface into the seal cavity, through the vent passages 92 into the zone 118, through the vent passages 102 into the zone 118, and through the vent passages 80 back into the gap G. The more highly concentrated contaminant material flows radially outwardly through the gap G in a countercurrent to the contaminant material flowing spirally inwardly, the inwardly flowing material being within a boundary layer close to the shaft housing surface 46.

Within the seal cavity 28 the path taken by the contaminant material will depend on the specific gravity thereof. Tests have shown that heavier material will follow a short path (e.g., dotted lines F in FIG. 8) while lighter material is more prone to follow a longer path (line K in FIG. 8). Tests have also shown that shortly after start-up the cavity 28 will be almost empty of contaminant material and that any material which does enter the cavity is almost immediately removed therefrom.

It would appear that since there is relative movement between the fluid in the gap G and the stationary protector 60 there will be a substantial pressure drop in the areas downstream of the first vent passages and this in turn promotes the flow of fluid through the second and third vent passages. Also, the pressure within the zone 118 will be lower than the pressure within the seal cavity as the fluid is moving more rapidly within the zone 118. This in turn enhances the fluid flows within the seal cavity and the flow of fluid, containing contaminants, back through the third vent passages 102 into the zone 118 for ejection through the first vent passages 80.

In view of the fact that there are pressure reductions axially across the protector 60 it becomes clear that the protector 60 serves to reduce the pressure within the seal cavity 28 below the pressure that it would experience absent the protector. Thus given a situation wherein there are virtually no contaminants to worry about, the present invention could be used to reduce pressures within the seal cavity 28. Of course, any protectors installed for the primary purpose of pressure reduction would still operate to reduce the level of whatever contaminants might be present in the operating fluid.

FIG. 9 to 12 illustrate two directions in which the design of a pressure reducing seal cavity protector might take. FIG. 9 for example shows a view, similar to FIG. 8, in which there is a plurality of axially adjacent annular zones 118, 118a, 118b..., each additional zone being defined by an annular flange 66a, 66b... with each flange 66a, 66b... having a set of fourth vent passages 102a, 102b... defined in the same manner as passages 102. Each zone will be at a lower pressure than the axially adjacent zone as one enters the seal cavity with the cavity being at a pressure lower than what it would be with but a one-zone protector 60 in place at the entrance thereto. If, in any particular instance, the pressure in cavity 28 could be reduced sufficiently by using a multi-zone protector it might then be possible to replace high-pressure seals in the cavity with low-pressure seals with a consequent saving in seal purchase and installation costs.

FIGS. 10 to 12 on the other hand illustrate a simpler, more basic, version of the invention which might be used primarily for pressure reduction. The protector 120 of this embodiment utilizes a cup-shaped element 122 which has an axially extending first annular wall portion 124, a second annular wall portion 126 and a transition wall portion 128 which may be arcuate, as shown, straight or of any other suitable configuration. The front or second wall portion 126 defines a circular opening 130 through which the rotary shaft is adapted to pass.

A plurality of circumferentially spaced apart generally tangentially directed vent passages 132 is provided in the transition wall portion 128, which passages serve to permit fluid to pass from the seal cavity 28 through the protector to the gap G between the housing 16 impeller. Each vent passage is defined by a slit 134 which passes through the transition wall 128. On one side of the slit a portion of the transition wall portion is depressed as at 136 to provide a larger through the wall portion 128. Optionally, a portion of the transition wall on the other side of the slit is raised relative, as at 138, to the surrounding wall material to further increase the opening at the slit. As seen in FIG. 10 the depressed portions 132 are all on the same side of the slits and the passage openings are oriented so as to face in the direction of fluid rotation.

As the shaft 14 rotates, fluid within the gap G will pass by the vent passages 132 and will cause a low pressure area to be created adjacent the element 122 outside the seal cavity 28 which will in turn cause fluid to be drawn from the seal cavity 28 through the vent passages 132. Fluid within the cavity is replenished through the space between the shaft and the edge of the opening 130 but the resulting steady-state operating pressure within the seal cavity 28 will be less than the normal operating pressure absent the protector 120. Furthermore any contaminants carried into the cavity 28 will be quickly removed therefrom due to the outward fluid flow through the vent passages, as described for the first embodiment.

If improved performance is required, a set of vent passages similar to passages 92 could be provided in front wall portion 126 so as to increase the flow into and then out of the cavity.

Clearly, the present invention provides a seal cavity protector which is capable of reducing operating pressures within the cavity and which also services to scavenge particulate contaminant material from the seal cavity, thereby reducing the possibility of damage to the shaft and/or the seals within the cavity. Specific embodiments of the invention have been described, which embodiments illustrate the principles associated with the invention. A skilled workman could undoubtedly deviate from the illustrated embodiments while still following the operating principles and hence the protection to be afforded this invention is to be determined from the claims appended hereto.

The embodiments of the invention in which an exclusive property or privilege is claimed are defined as follows:

1. A seal cavity protector for use with rotary fluid equipment a seal cavity of which is defined by a rotary shaft, a shaft housing and seal means engaging the shaft, said protector comprising an annular generally cup-shaped element adapted to pass the shaft therethrough and to be secured to the housing at the entrance to the seal cavity, said element including a plurality of circumferentially spaced apart, generally tangentially directed, first vent passages extending through the wall thereof whereby, with the protector in place and as the equipment rotates, a low pressure area is created adjacent said element outside the seal cavity and fluid within the seal cavity is drawn therefrom through the vent passages.

2. The protector of claim 1 wherein said element includes an axially extending first wall portion, a radially extending second wall portion defining a first opening through which the shaft can pass, and a transition wall portion connecting said first and second wall portions together, said first vent passages being located within said transition wall portion.

3. The protector of claim 2 wherein each of said first vent passages includes a generally radially extending slit through the transition wall portion with transition wall material at one side of the slit being depressed relative to surrounding transition wall material.

4. The protector of claim 3 wherein transition wall material at the other side of the slit is raised relative to surrounding transition wall material.

5. The protector of claim 2 wherein each of said first vent passages is defined by an L-shaped slit extending through the transition wall portion with one leg of the slit being oriented generally radially and the other leg being oriented generally circumferentially adjacent the first wall portion, the legs of the slit defining a first flap section which is bent outwardly relative to the surrounding transition wall portion.

6. The protector of claim 3 including a plurality of second vent passages extending through said second wall portion, each of said second vent passages including a third radial slit extending through said second wall portion from said opening and a fourth circumferential slit extending from said third slit, said third and fourth slits defining with the edge of said opening a second flap section which is bent inwardly relative to surrounding wall material.

7. The protector of claim 5 including a plurality of second vent passages extending through said second wall portion, each of said second vent passages including a third radial slit extending through said second wall portion from said opening and a fourth circumferential slit extending from said third slit, said third and fourth slits defining with the edge of said opening a second flap section which is bent inwardly relative to surrounding wall material.

8. The protector of claim 6 including an annular axially extending sleeve member within and to which said first wall portion of said element is secured, said sleeve member including an annular outwardly extending first flange at one end, adjacent said second wall portion, and an annular inwardly extending second flange at the other end thereof, said second flange defining a second opening through which the shaft can pass, said second flange also including a plurality of circumferentially spaced apart third vent passages extending therethrough.

9. The protector of claim 7 including an annular axially extending sleeve member within and to which said first wall portion of said element is secured, said sleeve member including an annular outwardly extending first flange at one end, adjacent said second wall portion, and an annular inwardly extending second flange at the other end thereof, said second flange defining a second opening through which the shaft can pass, said second flange also including a plurality of circumferentially spaced apart third vent passages extending therethrough.

10. The protector of claim 8 wherein each third vent passage includes a fifth slit extending through the second flange radially inwardly from adjacent said sleeve and a sixth slit extending through the second flange, circumferentially adjacent said sleeve from said fifth slit, said fifth and sixth slits defining a third flap section which is bent inwardly.

11. The protector of claim 10 wherein each of said first, second and third vent passages is oriented for fluid flow therethrough in the direction of rotation of the shaft passing through said first and second openings.

12. The protector of claim 11 wherein said first flange includes a plurality of circumferentially spaced apart apertures therethrough each adapted to receive a fastener suitable for securing said first flange to a face of the equipment shaft housing at the entrance to the seal cavity.

13. The protector of claim 12 wherein said first flange includes a plurality of circumferentially spaced apart generally triangular raised flow deflectors on the outer surface thereof, said deflectors serving to increase the circumferential flow component of fluid moving radially inwardly adjacent said protector during operation of the rotary fluid equipment.

14. The protector of claim 9 wherein each third vent passage includes a fifth slit extending through the second flange radially inwardly from adjacent said sleeve and a sixth slit extending through the second flange, circumferentially adjacent said sleeve from said fifth slit, said fifth and sixth slits defining a third flap section which is bent inwardly.

15. The protector of claim 14 wherein each of said first, second and third vent passages is oriented for fluid flow therethrough in the direction of rotation of the shaft passing through said first and second openings.

16. The protector of claim 15 wherein said first flange includes a plurality of circumferentially spaced apart apertures therethrough each adapted to receive a fastener suitable for securing said first flange to a face of the equipment shaft housing at the entrance to the seal cavity.

17. The protector of claim 16 wherein said first flange includes a plurality of circumferentially spaced apart generally triangular raised flow deflectors on the outer surface thereof, said deflectors serving to increase the circumferential flow component of fluid moving radially inwardly adjacent said protector during operation of the rotary fluid equipment.

18. A seal cavity protector for use with rotary fluid equipment a seal cavity of which is defined by a rotary shaft, a shaft housing and seal means engaging the shaft, said protector comprising: a first annular flange adapted to be secured to the shaft housing at the entrance to the seal cavity; sleeve means extending axially from an inner annular edge of the first flange; a second annular flange extending radially inwardly from said sleeve means; and an annular cup-shaped element having a first wall portion within and secured to said sleeve means, a second radially extending wall portion and a transition wall portion between said first and second wall portions; said second wall portion and said second flange defining respective circular openings through which the shaft can pass; a plurality of circumferentially spaced apart first vent passages extending through said transition wall portion; a plurality of circumferentially spaced apart second vent passages extending through said second wall portion; and a plurality of circumferentially spaced apart third vent passages extending through said second flange; said second and third vent passages opening into an annular zone bounded by said element and said second flange and said first vent passages opening out of said zone; whereby with said protector in place and as the equipment rotates a low pressure area is created adjacent said element outside the seal cavity, fluid carrying contaminant material is drawn into said annular zone through said second and third vent passages from adjacent said element and from within the seal cavity respectively and contaminant carrying fluid is drawn from said zone through said first vent passages for removal from the operating equipment.

19. The protector of claim 18 wherein said second vent passages are oriented to direct fluid in a tangential direction relative to said element into said zone.

20. The protector of claim 19 wherein: (a) each of said first vent passages is defined by an L-shaped slit extending through the transition wall portion with one leg of the slit being oriented generally radially and the other leg being oriented generally circumferentially adjacent the first wall portion, the legs of the slit defining a first flap section which is bent outwardly away from said zone; (b) each of said second vent passages is defined by a third radial slit extending through the second wall portion from the opening defined thereby and a fourth circumferential slit extending from said third slit, said third and fourth slits defining a second flap section which is bent inwardly into said zone; and (c) each of said third vent passages is defined by a fifth slit extending through the second flange, radially inwardly from adjacent said sleeve means, and a sixth slit extending through the second flange circumferentially adjacent said sleeve means from said fifth slit, said fifth and sixth slits defining a third flap section which is bent inwardly into said zone.

21. The protector of claim 20 including an axially extending sleeve extension and a radially inwardly extending annular third flange, said third flange, sleeve extension and second flange defining another annular zone, said third flange including circumferentially spaced apart fourth vent passages passing therethrough into said another zone, each of said fourth vent passages being defined by a seventh slit extending through the third flange, radially inwardly from adjacent said sleeve extension, and an eighth slit extending through the third flange circumferentially adjacent said sleeve extension from the seventh slit, said seventh and eighth slits defining a fourth flap section which is bent inwardly into said another zone.

* * * * *